(12) United States Patent
Meis et al.

(10) Patent No.: US 9,039,245 B2
(45) Date of Patent: May 26, 2015

(54) ENERGY EFFICIENT SIGN

(75) Inventors: Michael A. Meis, Stillwater, MN (US);
David G. Freier, St. Paul, MN (US);
Patrick R. Fleming, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 471 days.

(21) Appl. No.: 13/519,364

(22) PCT Filed: Dec. 28, 2010

(86) PCT No.: PCT/US2010/062171
§ 371 (c)(1),
(2), (4) Date: Oct. 3, 2012

(87) PCT Pub. No.: WO2011/082140
PCT Pub. Date: Jul. 7, 2011

(65) Prior Publication Data
US 2013/0033875 A1    Feb. 7, 2013

Related U.S. Application Data

(60) Provisional application No. 61/291,138, filed on Dec. 30, 2009.

(51) Int. Cl.
*F21V 13/04* (2006.01)
*G09F 13/10* (2006.01)
*G02B 3/00* (2006.01)
(Continued)

(52) U.S. Cl.
CPC ............ *G09F 13/10* (2013.01); *Y10T 29/49826* (2015.01); *G02B 3/005* (2013.01); *G02B 5/0226* (2013.01); *G09F 13/14* (2013.01); *G09F 2013/0422* (2013.01);
(Continued)

(58) Field of Classification Search
CPC ....... G09F 13/10; G09F 13/14; G02B 5/0226; G02B 3/005
USPC ................. 362/97.1, 308, 309, 327
See application file for complete search history.

(56) References Cited

U.S. PATENT DOCUMENTS 3,653,138 A    4/1972 Cooper
4,021,945 A    5/1977 Sussman
(Continued)

FOREIGN PATENT DOCUMENTS

CN    1885129    12/2006
CN    101583987    11/2009
(Continued)

OTHER PUBLICATIONS

International Search Report for PCT/US2010/060788, Mailing Date Jul. 19, 2011, 3 pages.
(Continued)

*Primary Examiner* — David V Bruce
(74) *Attorney, Agent, or Firm* — Colene Blank; Steven A. Bern

(57) ABSTRACT

A light directing composite film includes a planar top major surface, a planar bottom major surface, a plurality of lenticular lens elements disposed between the top major surface and the bottom major surface, and a plurality of light reflection regions and light transmission regions disposed between the plurality of lenticular lens and the planar bottom major surface.

18 Claims, 2 Drawing Sheets

(51) Int. Cl.
  *G02B 5/02* (2006.01)
  *G09F 13/14* (2006.01)
  *G09F 13/04* (2006.01)
  *G09F 13/22* (2006.01)

(52) U.S. Cl.
  CPC .. *G09F 2013/0486* (2013.01); *G09F 2013/142* (2013.01); *G09F 2013/222* (2013.01)

(56) References Cited

U.S. PATENT DOCUMENTS

| | | | |
|---|---|---|---|
| 6,231,201 | B1 | 5/2001 | Rupp |
| 6,724,536 | B2 | 4/2004 | Magee |
| 6,876,408 | B2 | 4/2005 | Yamaguchi |
| 6,970,288 | B2 | 11/2005 | Ebina |
| 8,045,092 | B2 | 10/2011 | Jeong et al. |
| 8,287,158 | B2 | 10/2012 | Hwang |
| 2001/0012078 | A1 | 8/2001 | Hira |
| 2006/0056022 | A1 | 3/2006 | Yeo |
| 2006/0061869 | A1 | 3/2006 | Fadel |
| 2006/0164729 | A1 | 7/2006 | Wood |
| 2007/0002452 | A1 | 1/2007 | Munro |
| 2007/0002453 | A1 | 1/2007 | Munro |
| 2007/0127098 | A1 | 6/2007 | Wood |
| 2008/0284943 | A1 | 11/2008 | Jeong et al. |

FOREIGN PATENT DOCUMENTS

| | | | |
|---|---|---|---|
| JP | 2000-047329 | | 2/2000 |
| JP | 2000-199804 | | 7/2000 |
| JP | 2000199804 | A * | 7/2000 |
| JP | 2006-030596 | | 2/2006 |
| JP | 2006-330149 | | 12/2006 |
| JP | 2007-003908 | | 1/2007 |
| JP | 2008-275655 | | 11/2008 |
| KR | 10-2009-0083688 | | 8/2009 |
| KR | 2009083688 | A * | 8/2009 |
| WO | WO 2009/110736 | | 9/2009 |
| WO | WO 2011-082140 | | 7/2011 |
| WO | WO 2011-090625 | | 7/2011 |

OTHER PUBLICATIONS

International Search Report for PCT/US2010/062171; Mailing Date Aug. 18, 2011, 3 pages.

* cited by examiner

ENERGY EFFICIENT SIGN

CROSS REFERENCE TO RELATED APPLICATIONS

This application is a national stage filing under 35 U.S.C. 371 of PCT/US2010/062171, filed Dec. 28, 2010, which claims priority to U.S. Provisional Application No. 61/291,138, filed Dec. 30, 2009, the disclosure of which is incorporated by reference in its/their entirety herein.

BACKGROUND

There are a number of major types of illuminated sign technologies presently in use. A first type is surface-painted signs which are illuminated by external light sources, such as floodlights, which are generally located at acute angles to the sign. Light energy is wasted since, a) the entire sign surface is illuminated (not just the message), and b) a great percentage of the light reflected never reaches the observer either being spilled off to the sky or ground.

A second type of illuminated sign is a lighted box sign where a light source is placed behind a translucent surface (that can provide structural support for the sign) with the message spelled out on the translucent surface, in characters contrasting to the translucent surface background. Light energy is produced to provide equal luminous emission over the face of the sign, including the background, as opposed to lighting only the character which has to be seen. Only a small fraction of the light produced reaches the eye of the observer, as the light exits the sign in all directions including upwards, thus wasting energy and causing a considerable amount of light pollution.

A third type of illuminated sign includes signs including light sources which themselves spell out the sign message. Neon signs, exposed incandescent filament lamp signs and channel letters are examples of this technology. When not lit, these signs are not readily visible (unless paint is applied under the character or symbol) and are thus dependent on being illuminated to deliver the message. These signs are costly to make, operate and maintain as they are custom made for the client, of limited life span, fragile and the incandescent version is energy wasteful.

A fourth type of illuminated sign includes an LED matrix sign. LED technology is taken advantage of to create changing-message signs. These dynamic message signs are computer-controlled and provide interesting and attention-grabbing signs which are a solution to illuminated signs with the need for a changing message.

However, most illuminated signs are of a fixed message, and these signs are initially expensive and costly to operate and maintain.

BRIEF SUMMARY

The present disclosure relates to light directing composite films for energy efficient illuminated signs. In particular, the present disclosure relates to light directing composite films for signage that preferentially direct light toward a viewer.

In one illustrative embodiment, a light directing composite film includes a planar top major surface, a planar bottom major surface, a plurality of lenticular lens elements disposed between the top major surface and the bottom major surface, and a plurality of light reflection regions and light transmission regions disposed between the plurality of lenticular lens and the planar bottom major surface.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1:
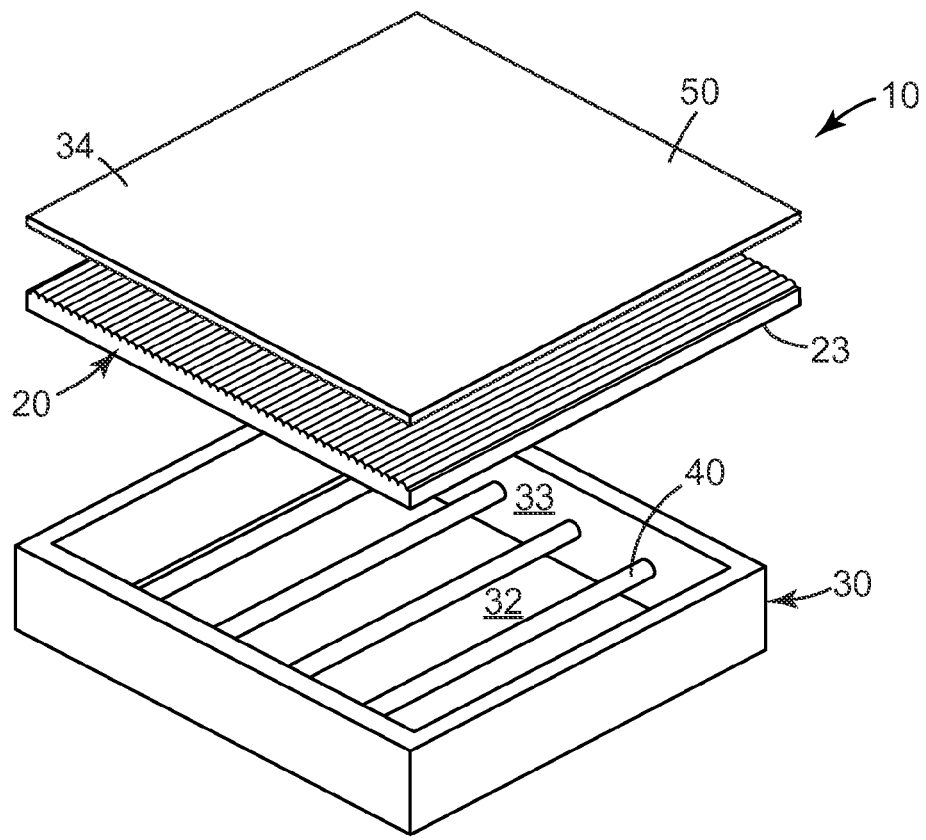
FIG. 1 is an exploded perspective schematic diagram of an illustrative illuminated sign including the light directing composite film described herein.

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "top," "bottom," "lower," "upper," "beneath," "below," "above," and "on top," if used herein, are utilized for ease of description to describe spatial relationships of an element(s) to another. Such spatially related terms encompass different orientations of the device in use or operation in addition to the particular orientations depicted in the figures and described herein. For example, if a cell depicted in the figures is turned over or flipped over, portions previously described as below or beneath other elements would then be above those other elements.

As used herein, when an element, component or layer for example is described as being "on" "connected to," "coupled with" or "in contact with" another element, component or layer, it can be directly on, directly connected to, directly coupled with, in direct contact with, or intervening elements, components or layers may be on, connected, coupled or in contact with the particular element, component or layer, for example. When an element, component or layer for example is referred to as begin "directly on," "directly connected to," "directly coupled with," or "directly in contact with" another element, there are no intervening elements, components or layers for example.

The present disclosure relates to light directing composite films for energy efficient illuminated signs. In particular, the present disclosure relates to light directing composite films for signage that preferentially direct light toward a viewer. The light directing composite films includes light transmission windows that are registered with lenticular collimating lenses and light reflection areas between the light transmission windows. The angular distribution of the light exiting the illuminated sign is determined by the geometry of the lens and the size and position of the light transmission windows with respect to the focal point of the lens. Light that strikes the interior surface of the light collimating substrate between the light transmission windows is substantially reflected and recycled within the illuminated sign enclosure until it strikes a surface of a light transmission window and is transmitted through the light collimating substrate. In this manner the light emitted by the illuminated sign conforms to a controlled angular distribution of brightness. These illuminated signs exhibit diminished brightness where illumination is not desired (e.g., reduced "light pollution"), increased brightness where illumination is desired (e.g., to a viewer of the sign), and/or enhanced spatial uniformity of emission. While the present disclosure is not so limited, an appreciation of various aspects of the disclosure will be gained through a discussion of the examples provided below.

FIG. 1 is an exploded perspective schematic diagram of an illustrative illuminated sign 10. The illuminated sign 10 includes an enclosure 30 and a light source 40 disposed within the enclosure 30. The enclosure 30 includes a light reflection surface 32, 33 and a light emission surface 34. In many embodiments, the enclosure 30 forms a light box having side surfaces 33 and a back surface 32. In some embodiments the back surface is fully reflective. In some embodiments the back surface 32 includes a second light emission surface that is of similar construction of the light emission surface 34, forming a double-sided illuminated sign. A light directing composite film 20 can form at least a portion of the light emission surface 34. The light directing composite film 20 is described below and can include light transparent substrate 50 forming a planar top surface.

The light reflection surface 32, 33 can be formed of any useful light reflection material and can be highly efficient to maximize light efficiency. In many embodiments the light reflection surface 32, 33 are at least 90% efficient or at least 95% efficient. In some embodiments, the light reflection surface 32, 33 can be a reflective or mirror film. One commercially available reflective film is available under the trade designation Light Enhancement Film 3635-100 from 3M Company, St. Paul, Minn. The light reflection surface 32, 33 can be diffusely reflective or specularly reflective. Diffusely reflective surfaces can include white paint or a material that includes $TiO_2$ particles. The light reflection surface 32, 33 can be formed by applying a light reflection material layer by flooding the grooved surface with the reflective coating material and metering off excess reflective coating material, resulting in grooves filled with reflective coating material and exposed light transmission regions.

The light source 40 can be any useful light source 40. In some embodiments the light source 40 is fluorescent tubes. In some embodiments the light source 40 is solid state devices such as light emitting diodes, for example. When fluorescent tubes are utilized, the fluorescent tubes can run in any orientation within the enclosure.

Figure 2:
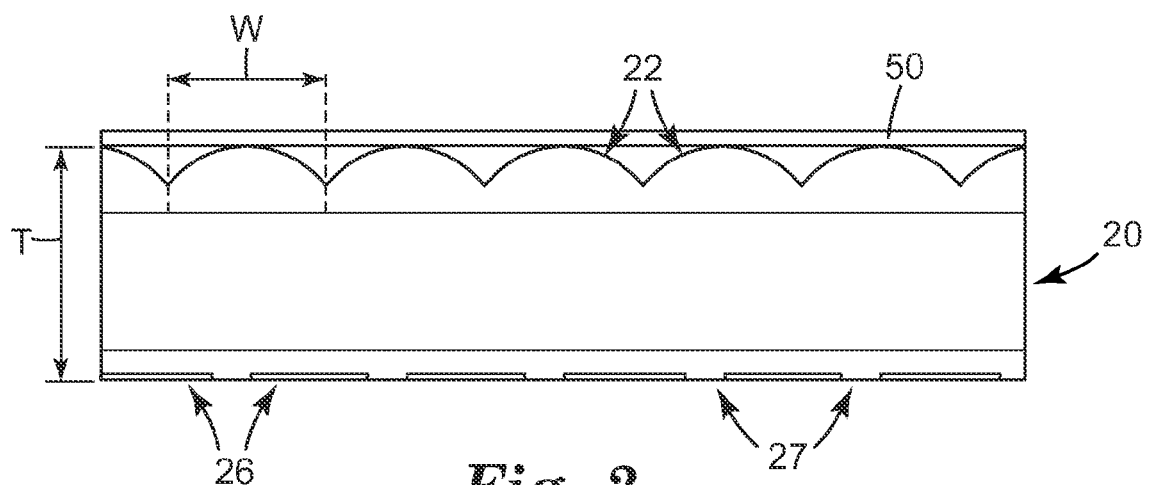
FIG. 2 is a cross-sectional schematic diagram of an illustrative light directing composite film.
Figure 3:
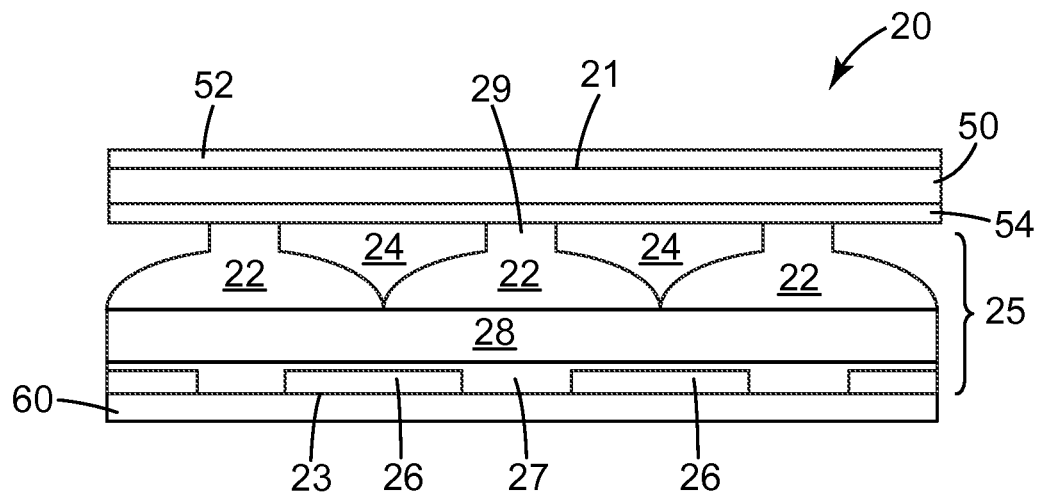
FIG. 3 is a cross-sectional schematic diagram of another illustrative light directing composite film.
Figure 4:
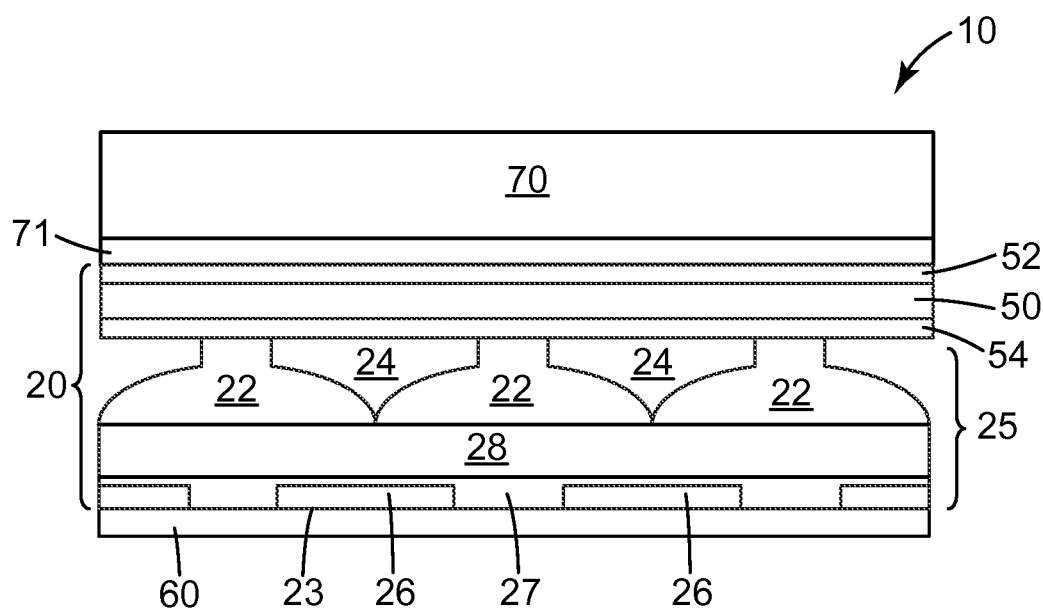
FIG. 4 is a cross-sectional schematic diagram of an illustrative light directing composite film coupled to a transparent graphic substrate.

FIG. 2 is a cross-sectional schematic diagram of an illustrative light directing composite film 20. FIG. 3 is a cross-sectional schematic diagram of another illustrative light directing composite film 20. FIG. 4 is a cross-sectional schematic diagram of an illustrative light directing composite film 20 coupled to a transparent graphic substrate 70. The light directing composite film 20 can emit light from the enclosure 30 or light emission surface 34 at an angle of less than 90 degrees from the planar top major surface 21 or light emission surface 34, thus the emitted light can be directed "downward" from normal and toward a viewer on a ground looking up at an illuminated sign.

A light directing substrate or composite film 20 forms at least a portion of the light emission surface 34 of the illustrative illuminated sign 10 illustrative illuminated sign 10 of FIG. 1. The light directing composite film 20 can form a portion of a structural element (front or back surface of the illuminated sign 10, for example). The light directing composite film 20 includes a back major surface 23 forming a portion of an inner surface of the enclosure 30. The back major surface 23 includes light reflection regions 26 and light transmission regions 27. The light reflection regions 26 can separate the light transmission regions 27. A front or top major surface 21 opposes the back bottom major surface 23. The front or top major surface 21 includes a plurality of lenticular lens elements 22. The light transmission regions 27 can be arranged to be at or near the focus points of the lenticular lens elements 22 and the light reflection regions 26 can occupy the remaining area of the back major surface 25. The lenticular lens elements 22 can be linear lenticular lens elements 22 and the light reflection regions 26 and light transmission regions 27 can be co-extensive linear elements that extend parallel to the linear lenticular lens elements 22. In many embodiments the lenticular lens elements 22 are linear lenticular lens elements 22 that are co-extensive across a length of the light directing substrate, as illustrated in FIG. 1.

FIG. 2 is a cross-sectional schematic diagram of an illustrative light directing composite film 20. In many embodiments, the light directing composite film 20 includes lenticular lens elements 22 and light transmission regions 27 aligned or registered at or near a focal point of a corresponding lenticular lens element 22 and a light transparent substrate 50 is disposed adjacent to the lenticular lens elements 22. Light reflection regions 26 can occupy the remaining area separating the light transmission regions 27. The light reflection regions 26 can be formed of any useful light reflection (diffuse or specular) material. In many embodiments, the light reflection regions 26 are at least 90% efficient or at least 95% efficient. In some embodiments, the light reflection regions 26 can be a reflective or minor film. One commercially available reflective film is available under the trade designation Light Enhancement Film from 3M Company, St. Paul, Minn. The light reflection regions 26 can be diffusely reflective or specularly reflective. Diffusely reflective surfaces can include white paint or a material that includes $TiO_2$ particles.

The light directing composite film 20 can have any useful thickness T. In many embodiments the light directing composite film 20 can form a front structural element of the illuminated sign. In these embodiments the light directing composite film 20 has a thickness T of 200 to 1000 micrometers or greater or from 200 to 400 micrometers. The lenticular lens elements 22 can have any useful lens width W. In many embodiments the lenticular lens elements 22 have a lens width W of 100 to 200 micrometers. The light directing composite film 20 can be formed of any useful light transmissive material.

FIG. 3 is a light directing composite film 20 that includes post elements 29 that extends or projects from the lenticular lens elements 22. The post elements 29 help to form the air gap 24 between the lenticular lens elements 22 and a light transparent substrate 50. The light transparent substrate 50 can be fixed or adhered to the post elements 29 of the lenticular lens elements 22 with by any useful manner. The air gap 24 separates at least a portion of the lenticular lens elements 22 from the light transparent substrate 50.

In many embodiments, an adhesive layer 54, 52 is disposed on one or both sides of the transparent substrate 50. The adhesive layer 54, 52 can be any useful adhesive material such as, a pressure sensitive adhesive, for example. A release layer (not shown) can be disposed on the adhesive layer 52 to protect the adhesive layer until it is ready to be exposed by a user and applied to a front light transparent substrate 70. The release liner layer is configured to be removed and expose the pressure sensitive adhesive layer 52.

A graphic image (e.g., a solid color or multicolored image) can be disposed at any useful location within or adjacent to the front light transparent substrate 70. The light reflection regions 26 reflect light both back into the enclosure 30 and reflect light from outside the enclosure back through the front major surface 34. Thus the graphic image 71 can be seen by a viewer when the sign is illuminated from within the enclosure 30 and when illuminated by exterior light (such as daylight for example) incident on the sign 10.

The light directing composite film 20 includes a microreplicated film 25 fixed to a light transparent substrate 50. The resulting light directing composite film 20 includes a planar top major surface 21, a planar bottom major surface 23, a plurality of lenticular lens elements 22 disposed between the top major surface 21 and the bottom major surface 23, and a plurality of light reflection regions 26 and light transmission regions 27 are disposed between the plurality of lenticular lens 22 and the planar bottom major surface 23.

In some embodiments, the light directing composite film 20 planar bottom major surface 23 includes a light diffuser layer 60. The light diffuser layer 60 can be formed of any useful material and can function to diffuse light an to assist in "hiding" point light sources illuminating the light directing composite film 20 in the enclosure 30 of the illuminated sign 10. The light diffuser layer 60 can be fixed to the light directing composite film 20 in any useful manner such as, an adhesive layer, for example.

The light directing composite film 20 can be designed to have any useful dimensions and formed in any useful manner. In some embodiments, a plurality of lenticular lens elements 22 are microreplicated or formed on a substrate 28 first major surface and a plurality of light transmission regions 27 are microreplicated or formed on an opposing second major surface of the substrate 28. In many embodiments, the lenticular lens elements 22 and the light transmission regions 27 are formed at the same time and are registered.

Exemplary dimensions of this article include linear lenticular lens elements 22 having a width in a range from 100 to 250 micrometers, a height in a range from 20 to 60 micrometers, and a post element 29 height of 20 to 30 micrometers and a post element 29 width of 20 to 50 micrometers. The substrate 28 can be any useful light transmissive material (e.g., polyethylene terephtalate) having any useful thickness such as 50 to 200 micrometers, for example. The light transmission regions 27 can have a width in a range from 25 to 75 micrometers and a height from 50 to 200 micrometers. The light transmission regions 27 can be any useful light transmissive material (e.g., acrylate) and define a channel between adjacent light transmission regions 27.

A light reflective material can be disposed in the channel between adjacent light transmission regions 27 to form the light reflection regions 26. The light reflection regions 26 can be formed of any useful light reflective material that has a light reflection of 80% or greater, or 85% or greater, or 90% or greater, or 95% or greater. One commercially available reflective material is available under the trade designation Light Enhancement Film from 3M Company, St. Paul, Minn. In some embodiments, the reflective material includes white paint or a material that includes $TiO_2$ particles. The light reflective regions 26 can have a width in a range from 50 to 200 micrometers or from 75 to 150 micrometers and a height from 50 to 200 micrometers.

A light transparent substrate 50 can be disposed on the plurality of lenticular lens elements 22, forming an air gap 24 between at least a portion of the lenticular lens elements 22 and the light transparent substrate 50, as described above.

Two identical illumined signs were constructed except that one illuminated sign held a conventional diffusing front substrate with graphic and the second illuminated sign held a light directing composite film with graphic. Average brightness was measured at a particular viewing position. The illuminated sign that included the light directing composite film with graphic had an average brightness that was over two times brighter than the illuminated sign that held the conventional diffusing front substrate with graphic.

Thus, embodiments of the LIGHT DIRECTING COMPOSITE FILM FOR ENERGY EFFICIENT SIGN are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation, and the present invention is limited only by the claims that follow.

What is claimed is:
1. A light directing composite film comprising;
   a planar top major surface comprising a light transparent substrate having a pressure sensitive adhesive layer disposed thereon;
   a planar bottom major surface;
   a plurality of lenticular lens elements disposed between the top major surface and the bottom major surface; and
   a plurality of light reflection regions and light transmission regions disposed between the plurality of lenticular lens and the planar bottom major surface.

2. The light directing composite film according to claim 1, wherein the planar bottom major surface comprises a light diffuser layer.

3. The light directing composite film according to claim 1, wherein the light transparent substrate is fixed to the plurality of lenticular lens elements.

4. The light directing composite film according to claim 3, wherein at least selected lenticular lens elements comprise a post element projecting form the lenticular lens element and the post elements are fixed to the light transparent substrate.

5. The light directing composite film according to claim 1, wherein a release liner layer is disposed on the pressure sensitive adhesive layer and the release liner layer is configured to be removed and expose the pressure sensitive adhesive layer.

6. The light directing composite film according to claim 1, wherein the lenticular lens elements are linear lenticular lens elements and the light reflection regions and light transmission regions are linear light reflection regions and linear light transmission regions.

7. The light directing composite film according to claim 3, wherein an air gap separates at least a portion of the lenticular lens elements from the light transparent substrate.

8. An illuminated sign comprising:
   an enclosure comprising a light reflection surface and a light emission surface;
   a light source disposed within the enclosure; and
   a light directing composite film according to claim 1 forming at least a portion of the light emission surface.

9. An illuminated sign according to claim 8, further comprising a graphic image disposed on or in the light emission surface.

10. An illuminated sign according to claim 8, wherein the light reflection regions reflect light back into the enclosure and reflect light through the front major surface.

11. An illuminated sign according to claim 9, wherein the graphic image is visible when the light source emits light and when the light source does not emit light.

12. An illuminated sign according to claim 8, wherein light is collimated and emitted from the light emission surface at an angle of less than 90 degrees from the planar top major surface of the light directing composite film.

13. An illuminated sign according to claim 9, wherein the graphic image is fixed to the planar top major surface of the light directing composite film with a pressure sensitive adhesive.

14. A method comprising:
   forming a plurality of lenticular lens elements on a substrate first major surface;
   forming a plurality of light reflection regions and light transmission regions on a second major surface of the substrate, the second major surface opposing the first major surface, and wherein the light reflection regions and the light transmission regions are formed at substantially the same time;
   disposing a light transparent substrate on the plurality of lenticular lens elements, forming an air gap between at least a portion of the lenticular lens elements and the light transparent substrate.

15. The method according to claim 14, wherein the plurality of lenticular lens elements are linear lenticular lens elements and the plurality of light reflection regions and light transmission regions are linear light reflection regions and light transmission regions and the linear lenticular lens elements are registered with the linear light reflection regions and light transmission regions.

16. The method according to claim 14, further comprising disposing a light diffusing layer on the light reflection regions and light transmission regions.

17. The method according to claim 14, wherein the light transmission regions comprise light transmissive material and the light reflection regions comprise light reflective material and form a substantially planar major surface.

18. The method according to claim 14, further comprising filling channels defined by adjacent light transmission regions with light reflective material to form the plurality of light reflection regions and light transmission regions.

* * * * *